United States Patent
Vanhoorne et al.

(10) Patent No.: US 6,939,915 B2
(45) Date of Patent: Sep. 6, 2005

(54) METHOD FOR AGGLOMERATING FINELY DIVIDED POLYBUTADIENE LATICES

(75) Inventors: Pierre Vanhoorne, Düsseldorf (DE); Bernhard Jansen, Köln (DE); Herbert Eichenauer, Dormagen (DE); Rolf-Volker Meyer, Much (DE), olf-

(73) Assignee: Bayer Aktiengesellschaft, Leverkusen (DE)

(*) Notice: Subject to any disclaimer, the term of this patent is extended or adjusted under 35 U.S.C. 154(b) by 327 days.

(21) Appl. No.: 10/220,949
(22) PCT Filed: Feb. 27, 2001
(86) PCT No.: PCT/EP01/02189
§ 371 (c)(1), (2), (4) Date: Sep. 6, 2002
(87) PCT Pub. No.: WO01/68715
PCT Pub. Date: Sep. 20, 2001

(65) Prior Publication Data
US 2003/0092803 A1 May 15, 2003

(30) Foreign Application Priority Data
Mar. 10, 2000 (DE) .......................... 100 11 703
Jan. 19, 2001 (DE) .......................... 101 02 210

(51) Int. Cl.⁷ .......................... C08L 53/00
(52) U.S. Cl. .......................... 525/88; 525/90; 525/94; 525/92 G; 524/313; 524/394; 524/502; 524/505
(58) Field of Search .......................... 523/335, 223; 524/570, 366

(56) References Cited

U.S. PATENT DOCUMENTS

| | | | |
|---|---|---|---|
| 3,288,741 A | | 11/1966 | Cheng .......................... 260/29.7 |
| 3,600,465 A | | 8/1971 | Kanpp et al. .......................... 260/880 |
| 3,956,218 A | * | 5/1976 | Keppler et al. .......................... 260/29.7 D |
| 3,988,010 A | | 10/1976 | Paster .......................... 259/8 |
| 3,989,661 A | | 11/1976 | Bondy .......................... 260/29.7 T |
| 4,001,486 A | * | 1/1977 | Phillips .......................... 528/492 |
| 4,014,843 A | | 3/1977 | Xanthopoulo .......................... 260/29.7 T |
| 4,043,955 A | * | 8/1977 | Paster .......................... 523/313 |
| 4,150,004 A | | 4/1979 | Schlueter .......................... 260/23.7 A |
| 4,357,270 A | * | 11/1982 | Pippa et al. .......................... 523/335 |
| 4,419,496 A | * | 12/1983 | Henton et al. .......................... 525/301 |
| 4,581,444 A | * | 4/1986 | Fujino .......................... 528/487 |
| 4,680,321 A | | 7/1987 | Graham .......................... 523/335 |
| 4,772,743 A | | 9/1988 | Schmidt et al. .......................... 560/86 |
| 4,950,709 A | | 8/1990 | Schlueter et al. .......................... 524/762 |
| 5,071,946 A | | 12/1991 | Schmidt et al. .......................... 528/306 |
| 5,100,945 A | | 3/1992 | Schmidt et al. .......................... 524/311 |
| 5,262,455 A | * | 11/1993 | Riess et al. .......................... 523/335 |
| 5,373,054 A | * | 12/1994 | Sanuki et al. .......................... 525/57 |
| 5,470,895 A | * | 11/1995 | Kidder et al. .......................... 525/335 |

FOREIGN PATENT DOCUMENTS

| | | | | |
|---|---|---|---|---|
| CA | 1056975 | | 6/1979 | |
| DE | 1247665 | | 8/1967 | |
| DE | 1 669 735 | * | 6/1971 | .......... C08F/41/02 |
| DE | 100 37 280 A1 | * | 2/2002 | .......... C08C/1/07 |
| EP | 0 029 613 | | 6/1981 | |
| EP | 0 249 554 | | 12/1987 | |
| EP | 0 249 554 A1 | * | 12/1987 | .......... C08C/1/07 |
| GB | 2 237 280 A | * | 5/1991 | .......... C08J/3/12 |

OTHER PUBLICATIONS

RO 93165 A (abstract).*

* cited by examiner

Primary Examiner—David W. Wu
Assistant Examiner—Rip A Lee
(74) Attorney, Agent, or Firm—Joseph C. Gil; Jennifer R. Seng

(57) ABSTRACT

The present invention relates to a method for agglomerating finely divided rubber latices by adding an aqueous solution of a water-soluble amphiphilic copolymer that contains at least one hydrophilic portion and at least one hydrophobic portion.

8 Claims, 3 Drawing Sheets

*Fig. 2* Particle size distribution of agglomerated latex of Example 1

Fig. 3
Dark field microscope images of the agglomerated latex of Example 2
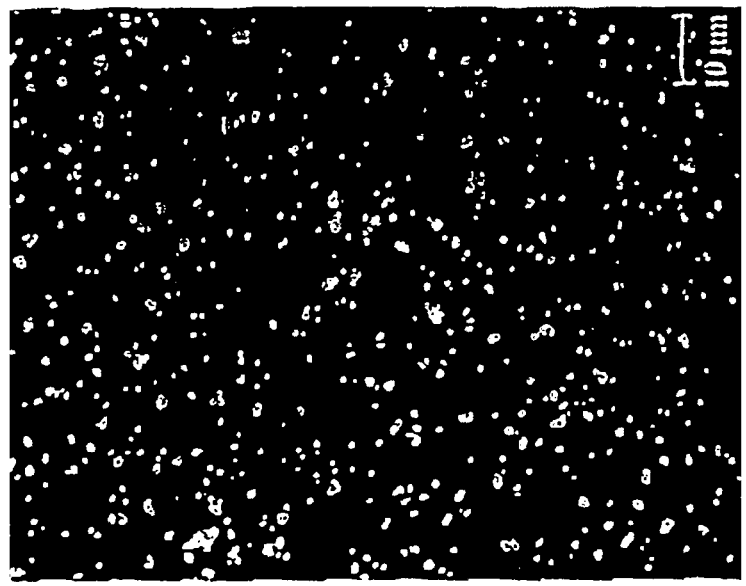
1000 × magnification
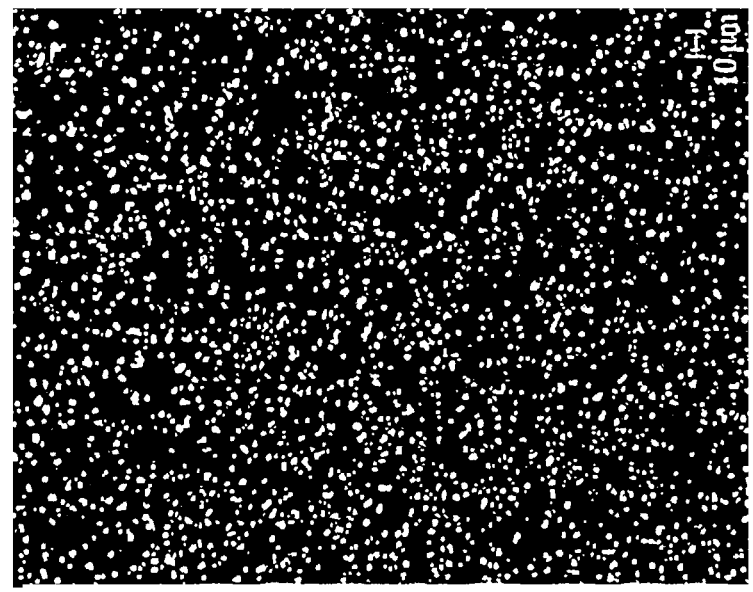
400 × magnification

METHOD FOR AGGLOMERATING FINELY DIVIDED POLYBUTADIENE LATICES

FIELD OF THE INVENTION

The present invention relates to a process for the agglomeration of finely particulate rubber latices by adding an amphiphilic block copolymer. The term agglomeration in this context is understood to mean the coalescence of latex particles to form spherical heaps, the primary particles being partially to completely fused together.

BACKGROUND OF THE INVENTION

Coarse rubber particles can be produced by direct emulsion polymerisation, such as is described for example in DE-A 1 247 665 and 1 269 360. However, these direct polymerisation processes have the disadvantage of long polymerisation times, as a rule lasting several days, until the desired particle diameter is achieved at almost complete conversion. In order to keep the polymerisation times as short as possible, high polymerisation temperatures are also often employed. This leads to the formation of Diels-Alder adducts such as vinylcyclohexene that are difficult to remove and that persistently remain in the latex particles.

As an alternative to direct polymerisation coarse rubber particles can be produced by agglomeration of finely particulate latices. The term finely particulate latices is understood to mean those having a mean particle diameter (DVN) of 40 to 250 nm. The more finely particulate the latex, the shorter the polymerisation time. The agglomeration can be initiated by physical and chemical processes. In this connection it is very difficult to avoid the formation of undesirable coagulate, i.e. very large agglomerates (ranging from several μm up to mm size) that separate out from the dispersion and cannot be redispersed. Such coarse fractions also reduce the gloss and adversely affect the mechanical and surface properties of plastics materials, e.g. ABS, produced from the latex.

A chemical method of enlarging rubber latices is described in DE-A 2 606 715, according to which acetic anhydride is added to the rubber latex. The acetic acid released by hydrolysis neutralises the carboxylate emulsifier and destabilises the latex until the rubber particles agglomerate. The process can be used only with weakly acid emulsifiers however, such as for example salts of organic acids. Latices that are stabilised with highly active sulfonate or sulfate emulsifiers cannot be agglomerated by this method. This process also has the disadvantage that the agglomerating latex cannot be stirred during the agglomeration phase on account of its extreme sensitivity to shear forces and has to be stabilised after the agglomeration with acid-stable emulsifiers or alkali. This results in a large amount of effluent. The possibility of performing a continuous agglomeration in particular is excluded. A continuous agglomeration process has the great advantage that the process can be controlled and regulated in the event of disturbances in the agglomeration and/or deviations from the desired mean agglomerate size.

According to the teaching of DE-A 2 645 082 the agglomeration is initiated by oxidised polyethylene oxide. The agglomerated latices have a very broad particle size distribution, which is disadvantageous for example in the production of ABS. Also the latices obtained by this method are only limitedly stable during further processing steps. If unoxidised polyethylene oxide (PEO) is used, ammonium salts must be added (U.S. Pat. No. 3,288,741), resulting in a relatively high effluent burden. In EP-A 330 865 branched polyethylene oxide is used before and/or during the emulsion polymerisation. Here too considerable amounts of alkali salts or ammonium salts must be employed. Also, the use of PEO-containing emulsifiers is described for example in DE-A 2 323 547 (=U.S. Pat. No. 4,014,843) or U.S. Pat. No. 4,680,321. This leads to broad particle size distributions with a considerable proportion of non-agglomerated finely particulate rubber particles, and the formation of coagulate can be avoided only by using auxiliary emulsifiers.

In DE-A 2 427 960 a second latex containing carboxyl or amide groups is used as agglomerating agent. The agglomerated latices have a very broad particle size distribution and contain a considerable proportion of non-agglomerated finely particulate rubber particles. If a latex that is stabilised with a PEO-PS-PEO triblock copolymer is used as agglomerating agent, then according to the teaching of EP-A 249 554 narrow particle size distributions without any coagulate formation are achieved. The production of the latex used as agglomerating agent runs into difficulties however. Both processes involve the expensive production of a second latex, leading to additional costs.

SUMMARY OF THE INVENTION

The object of the invention is to develop an environmentally-friendly and inexpensive process by which finely particulate rubber latices can be agglomerated rapidly and with a low incidence of coagulate on a large scale and in an economically practicable manner to form uniformly coarse rubber latices.

This object is surprisingly achieved by using for the agglomeration amphiphilic block copolymers that have specific minimum molecular weights for the hydrophilic and hydrophobic blocks.

The present invention accordingly provides a process for the agglomeration of finely particulate rubber latices by adding an aqueous solution of a water-soluble amphiphilic copolymer comprising at least one hydrophilic segment and at least one hydrophobic segment, characterised in that the molecular weight HB of the largest hydrophobic segment and the molecular weight HL of the largest hydrophilic segment of the amphiphilic copolymer exceed the following minimum values:

HB>500 g/mole and

HL>2000 g/mole.

The term segment is understood to mean a coherent, linear, branched or cyclic part of the copolymer molecule that has comparable hydrophobic and/or hydrophilic properties along its structure.

BRIEF DESCRIPTION OF THE DRAWINGS

FIG. 3 shows the dark field microscope images of agglomerated rubber latex.

DETAILED DESCRIPTION OF THE INVENTION

Figure 1:
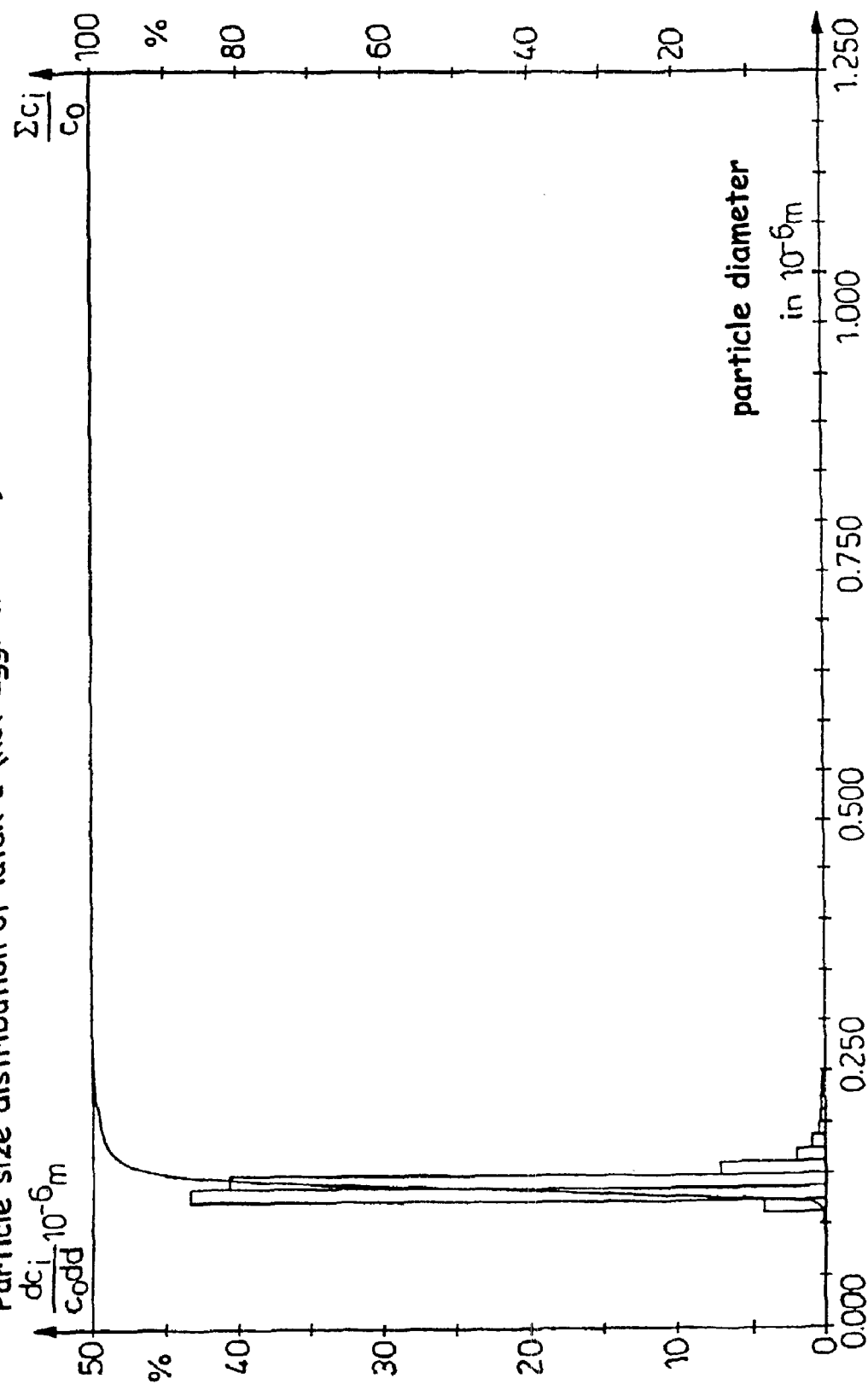
FIG. 1 shows the integral and differential weight distribution of the particle diameters of non-agglomerated latex.

The rubber latices to be agglomerated are produced by emulsion polymerisation of: at least one monomer selected from the group comprising butadiene, isoprene, alkyl acrylates, preferably $C_1$–$C_8$ alkyl acrylates, propylene oxide, dimethylsiloxane, phenylmethylsiloxane; up to 30 wt. %, preferably up to 20 wt. % of other monomers, such as for example (meth)acrylic esters, styrene, acrylonitrile, glycidyl (meth)-acrylate, allyl vinyl ether; and up to 10 wt. %, preferably up to 5 wt. % of crosslinking bifunctional monomers such as for example divinylbenzene, ethylene glycol dimethacrylate, ethylene glycol diacrylate. Particularly preferred are latices of butadiene with up to 30 wt. %, preferably up to 15 wt. % of other monomers such as for example, and preferably, (meth)acrylic esters, isoprene, styrene, acrylonitrile and up to 10 wt. %, preferably up to 5 wt. % of crosslinking bifunctional monomers such as for example divinylbenzene, ethylene glycol dimethacrylate and ethylene glycol diacrylate. The rubber is characterised by its glass transition temperature, which is below −20° C., preferably below −40° C. The rubber particles have a particle size that is below 300 nm, preferably between 40 and 250 nm, particularly preferably between 80 and 200 nm. These values refer to the $d_{50}$-value of the integral mass distribution, which can be determined for example by means of ultracentrifugation.

As emulsifiers there are generally used the conventional anionic emulsifiers such as alkyl sulfates, alkyl sulfonates, aralkyl sulfonates, soaps of saturated or unsaturated fatty acids (for example oleic acid, stearic acid), their oligomers (for example oleic acid dimer) as well as alkaline disproportionated or hydrogenated abietic acid or talloleic acid. Preferably emulsifiers containing carboxyl group(s) are used (for example salts of $C_{10}$–$C_{18}$ fatty acids or their oligomers, disproportionated abietic acid, emulsifiers according to DE-A 36 39 904 and DE-A 39 13 509), particularly preferably alkaline salts of a saturated or unsaturated oligomer of an unsaturated aliphatic carboxylic acid are used, and most particularly preferably alkali metal salts of dimeric or trimeric fatty acids with 24 to 66 carbon atoms are used. Mixtures of the aforementioned emulsifiers may also be used. The emulsifier content is 0.2 to 6 wt. %, preferably 0.5 to 2.5 wt. %, referred to the rubber to be agglomerated.

If more than 50 wt. %, referred to the total amount of emulsifier, of alkali metal salts of dimeric or trimeric fatty acids with 24 to 66 carbon atoms are used, then the agglomeration with the amphiphilic compounds according to the invention proceeds in a coagulate-free manner or with a particularly low incidence of coagulate. As emulsifiers for the production of the latex alkali metal salts of dimeric or trimeric fatty acids or mixtures thereof may be used in an amount of up to 50 wt. % of other anionic emulsifiers, for example carboxylate emulsifiers.

In order to reduce the viscosity in the production of the latices to be agglomerated and to sensitise the agglomeration, the conventional salts such as for example sodium sulfate, potassium chloride, sodium pyrophosphate or alkali metal carbonates may be used in amounts of 0.01 to 1 wt. % or 0.1 to 1 wt. %, referred to the rubber to be agglomerated.

The production of rubbers is generally known. For example, the polybutadiene polymerisation is initiated with thermally decomposable radical donors such as for example potassium persulfate or with redox initiator systems, such as are generally known to the person skilled in the art. The polymerisation temperature for polybutadiene is generally in the range +5° C. to +85° C., preferably between 40° C. and 70° C.

Rubber latices that can be agglomerated generally have a solids content of 30 to 50 wt. %, preferably 35 to 45 wt. %. Particularly preferred are low-salt and low-emulsifier diene latices with a narrow particle size distribution that have been produced by a seed addition process with 0.5 to 2.5 wt. % of emulsifier and 0.1 to 0.25% of salt, referred to the rubber. There are no problems in the production of graft latices and ABS when using the emulsifier-agglomerating agent combination according to the invention.

The rubber latex is agglomerated by adding an aqueous solution of an amphiphilic block copolymer. Aqueous solutions of block copolymers based on ethylene oxide are preferably used. The block copolymers may have different molecular structures, and may for example be linear, branched, comb-shaped or star-shaped. The amphiphilic properties are ensured if the block copolymers comprise at least one segment with a hydrophobic character and one segment with a hydrophilic character.

Monomers that belong to the hydrophobic segment are selected from all accessible hydrophobic monomers. The following may be mentioned by way of example and by preference: styrene, α-methylstyrene and their nuclear-substituted derivatives; olefins with 3 to 12 carbon atoms, preferably butadiene and/or isoprene; alkyl acrylates, alkyl methacrylates, preferably $C_1$–$C_4$-alkyl acrylates, $C_1$–$C_4$-alkyl methacrylates; propylene oxide; dimethylsiloxane, phenylmethylsiloxane; aliphatic hydrocarboxylic acids, preferably with 3 to 8 carbon atoms in the alkyl radical; esters of aromatic or aliphatic dicarboxylic acids, preferably aliphatic dicarboxylic acids with 3 to 12 C atoms in the alkyl radical or terephthalic acid with aliphatic diols with preferably 2–36, particularly preferably 2–18 C atoms in the alkyl radical, in particular ethylene glycol, butanediol; urethanes formed from aromatic or aliphatic diisocyanates, preferably selected from toluene diisocyanate, hexamethylene diisocyanate, isophorone diisocyanate and/or methylenediphenylene diisocyanate with the aforementioned diols; or mixtures of the aforementioned monomers. The hydrophobic segment may also contain up to 20 wt. % of other, i.e. hydrophilic monomers.

Monomers that may be included in the hydrophilic segment are all accessible hydrophilic monomers. The following may be mentioned by way of example and are preferred: ethylene oxide, acrylamide, alkaline salts of (meth)acrylic acid, vinylpyrrolidone, N-, 2- and 4-vinylpyridine, ethyleneimines, alkaline salts of 4-styrenesulfonic acid, vinyl alcohol, dimethylaminoethyl (meth)acrylate, hydroxyethyl (meth)acrylate. The hydrophilic segment may also contain up to 30 wt. % of other, i.e. hydrophobic monomers as mentioned above. Particularly preferably the hydrophilic segment comprises 70 to 100 wt. % of ethylene oxide units and 30 to 0 wt. % of propylene oxide units.

Preferred are linear polystyrene-polyethylene oxide diblock copolymers and branched copolymers based on polydimethylsiloxane with ethylene oxide-containing side chains.

The block copolymers to be agglomerated according to the invention are characterised in that the molecular weight HB of the largest hydrophobic segment of the copolymer is at least 500 g/mole, preferably at least 600 g/mole, and the molecular weight HL of the largest hydrophilic segment is at least 2000 g/mole, preferably at least 2200 g/mole. Water-soluble compounds are preferred. Compounds that do not reach these minimum values have scarcely any or even no agglomerating action.

The molecular weight of the hydrophobic segment may in general be up to 20,000 g/mole, preferably up to 10,000 g/mole. The molecular weight of the hydrophilic segment is generally up to 100,000, preferably 50,000, particularly preferably up to 20,000 g/mole.

The agglomerating solution may also contain several of the aforementioned block copolymers, as well as mixtures thereof with up to 70 wt. % of other non-agglomerating amphiphilic compounds and/or anionic emulsifiers.

The concentration of the block copolymers in the agglomerating solution should generally be between 1 and 50 wt. %, preferably between 5 and 30 wt. %.

The agglomerating solution may optionally contain up to 50 wt. % of a water-miscible organic solvent, such as for example and preferably methanol, ethanol, dioxane, tetrahydrofuran, pyridine, acetone, methyl ethyl ketone or acetonitrile. A satisfactory effect of the agglomerating agent is achieved only if a homogeneous solution is used.

The agglomerating solution may be used immediately after it has been prepared. If it is allowed to age for at least 3 days at a temperature between 20° C. and 40° C., the agglomeration is however more reproducible and more uniform and the coagulate formation is reduced, though it is still satisfactory. Best results are obtained if the agglomerating solution is aged for one week at 40° C. while stirring.

0.01 to 10 wt. %, preferably 0.05 to 5 wt. %, in particular 0.05 to 2 wt. % of block copolymers referred to rubber are used in the agglomeration. The agglomeration is carried out by adding the agglomerating solution to the rubber latex. The addition takes place within a few seconds, preferably in less than 60 seconds, under thorough mixing at a temperature that is generally between 5 and 70° C., preferably between 10 and 60° C., in particular between 10 and 50° C., and most particularly preferably between 20 and 40° C. Coagulate formation is often promoted if the temperature is higher than 70° C. The agglomeration may be carried out both batchwise and continuously.

After the end of the agglomeration extra stabilising agents may be added if necessary to the agglomerate-latex, such as for example anionic emulsifiers or antioxidants. The agglomerate-latex can also be post-treated thermally or mechanically, e.g. by heating or by homogenising machines.

EXAMPLES

In all examples the percentage values are:

in the latex: weight percent referred to the rubber to be agglomerated in the homogeneous solutions: weight percent referred to the total solution.

The particle sizes of the initial and agglomerated latices are determined by means of laser correlation spectroscopy (LCS) "ALV-5000 Multiple Tau digital Correlator" spectrometer, ALV-Laser Vertiebsgesellschaft mbH., Langen, Germany; wavelength 633 nm, 90° scattering angle). In addition the particle size distribution of some latices was measured by ultracentrifugation or specific turbidity measurements (Dr Lange Digital Photometer LP 1W, Dr Bruno Lange GmbH & Co. KG, Düsseldorf, Germany; wavelength 535 nm).

For some agglomerated latices the homogeneity was optically evaluated by dark field microscopy (Zeiss standard transmitted light microscope in dark field mode with Polaroid attachment camera MC 63 and Polaroid film Polaplan 57, magnifications 400× and 1000×, application of immersion oil between the lens and cover glass for 1000× magnification).

Rubber Latices

The polybutadiene latices were produced in a VA steel autoclave under nitrogen. The polybutyl acrylate latices were polymerised in a 2 l capacity glass flask under nitrogen.

For all seed addition polymerisations the seed latex was a narrow particle size distribution polybutadiene latex with a mean particle size $d_{50}$ of 40 nm.

If redox initiators were used, fully boiled, deionised water was exclusively used to prepare the solutions.

Production of a Polybutadiene Latex by the Seed Addition Process: Latex 1

42,220 g of deionised water, 3126 g of seed latex (narrow particle size distribution polybutadiene latex with a mean particle size of 40 nm and solids content of 35.3 wt. %), 804 g of a 7.5 wt. % solution of the potassium salt of the dimeric acid "Pripol® 1008" (Unichema, Germany) and 48.3 g of sodium sulfate are placed in a 120 l capacity VA steel autoclave under nitrogen. The autoclave is sealed, 4710 g of 1,3-butadiene and 66 g of tert.-dodecylmercaptan are metered in while stirring, and the vessel contents are heated to 50° C. When the temperature is constant a solution of 9.6 g of tert.-butyl hydroperoxide (80%) and 480 g of deionised water is first of all added in one go, and immediately thereafter a solution—prepared under nitrogen—of: 7.5 g of iron(II) complexonate solution (consisting of 13.464 g of EDTA-disodium salt, 75.176 g of 1M NaOH and 7.092 g of $(NH_4)_2[Fe(SO_4)_2] \cdot 6H_2O$ in 100 g of solution), 6.5 g of sodium hydroxymethanesulfinate (dihydrate), and 100 g of fully boiled, deionised water is added in one go. An exothermic reaction takes place. As soon as the internal temperature has exceeded its maximum value, the following metering streams are simultaneously started:

A) solution of 1,560 g of 1,3-butadiene and 199.8 g tert.-dodecylmercaptan in 10 hours B) 31,710 g of butadiene in 20 hours
C) solution of 38.4 g of tert.-butyl hydroperoxide (80%) and 2,500 g of deionised water
D) 9418 g of a 7.5 wt. % solution of the potassium salt of the dimeric acid Pripol® 1008
E) solution of 26 g of sodium hydroxymethanesulfinate dihydrate and 2476 g of deionised water C), D), E), in 25 hours. The polymerisation is discontinued when the pressure has fallen to 1.5 bar. The latex is then degassed and transferred to a plastics container.

104 l of a polybutadiene latex are obtained with 2.02% emulsifier (K salt of the hydrogenated dimeric acid of the oleic acid "Pripol® 1008"), 0.13% of sodium sulfate, mean particle diameter $d_{50}$ 142 nm, and 39.8 wt. % solids content. The integral and differential weight distribution of the particle diameters of this latex, measured by ultracentrifugation, are shown in FIG. 1.

The latices 1 to 8 listed in Table I were produced by similar processes. All the latices had similar narrow particle size distributions determined by ultracentrifugation.

Production of a Polybutadiene Latex by the Batch Process: Latex 9

12255.8 g of deionised water, 3678.9 g of a 10 wt. % solution of potassium oleate, 162.6 g of potassium hydroxide (1 N), 62.74 g of tetra-sodium diphosphate, 21.02 g of potassium persulfate and 52.55 g of tert.-dodecyl mercaptan are placed in a 40 l capacity VA steel autoclave under nitrogen. The autoclave is sealed, 10511.1 g of 1,3-butadiene are metered in while stirring, and the contents of the vessel are heated to 54° C. As soon as the temperature is reached this point in time is defined as reaction time 0. The following temperature profile is adopted:

| Reaction Time (hrs.) | Temperature (° C.) |
|---|---|
| 2.5 | 54.5 |
| 4.5 | 55 |
| 12 | 56 |
| 13 | 61 |
| 14 | 64 |
| 15 | 71 |
| 16 | 74 |

The polymerisation is discontinued when the pressure has fallen to 2 bar. The latex is then degassed and transferred to a plastics container.

34 l of a polybutadiene latex containing 3.50% of potassium oleate and 0.6% of sodium diphosphate are obtained, with a mean particle diameter $d_{50}$ of 64 nm and $d_{LKs}$=95 nm, and a solids content of 41.1 wt. %.

Production of a Polybutyl Acrylate Latex by the Seed Addition Process: Latex 10

405.1 g of deionised water, 89.3 g of seed latex (narrow particle distribution polybutadiene latex with a mean particle size of 40 nm and a solids content of 35.3 wt. %), 77.7 g of a 10 wt. % solution of the potassium salt of the dimeric acid "Pripol® 1013" (Unichema, Germany) and 0.65 g of sodium sulfate are placed in a 4 l capacity glass flask. 88.7 g of n-butyl acrylate are metered in while stirring and the reactor contents are heated to 80° C. When the temperature is constant, a solution of 0.73 g of potassium persulfate, 5.61 g of sodium hydroxide (1 N) and 30.7 g of deionised water is added in one go. The following metering streams are then started simultaneously:

F) Solution of 114.8 g of a 10 wt. % solution of the potassium salt of the dimeric acid "Pripol® 1008", 0.65 g of sodium sulfate, 2.17 g of potassium persulfate, 20 g of sodium hydroxide (1 N) and 778.2 g of deionised water
G) 874.3 g of n-butyl acrylate and are metered in within 4 hours.

At the end of the metering procedure the reactor contents are stirred for a further 2 hours at 80° C. and are then cooled. The latex is transferred to a plastics container.

2.5 l of a polybutyl acrylate latex containing 2% of emulsifier (K salt of the hydrogenated dimeric acid of oleic acid "Pripol® 1008") and 0.13% of sodium sulfate are obtained, having a mean particle diameter of 144 nm and a solids content of 40.9 wt. %

The latices 10 to 12 listed in Table II were produced by similar processes.

TABLE I

| Latex No. | Wt. % solids | pH value | Particle size (nm) | Initiator Type | Amount[1] | Regulator Type | Amount[1] | Emulsifier Type | Amount[1] | Electrolyte Type | Amount[1] | Polym. time (h) | Polym. temp. (° C.) |
|---|---|---|---|---|---|---|---|---|---|---|---|---|---|
| 1 | 39.8 | 9.3 | 142 | Redox | 0.19 | t-DDM | 0.7 | K-1008 | 2.02 | $Na_2SO_4$ | 0.13 | 35 | 50 |
| 2 | 40.3 | 12.2 | 134 | KPS | 0.30 | 50-50* | 0.7 | K-1013 | 1.25 | $Na_2SO_4$ | 0.13 | 35 | 58–69 |
| 3 | 40.0 | 9.3 | 143 | Redox | 0.19 | t-DDM | 0.7 | K-oleate | 2.02 | $Na_2SO_4$ | 0.13 | 34 | 50 |
| 4 | 40.1 | 9.1 | 145 | Redox | 0.19 | t-DDM | 0.7 | K-palmitate | 2.02 | $Na_2SO_4$ | 0.13 | 37 | 50 |
| 5 | 40.1 | 11.2 | 128 | KPS | 0.25 | 50-50* | 0.6 | T11 | 2.00 | $Na_2SO_4$ | 0.13 | 11 | 80–85 |
| 6 | 41.1 | 11.9 | 132 | KPS | 0.30 | t-DDM | 0.6 | Dresinate | 1.74 | $Na_2SO_4$ | 0.13 | 35 | 58–69 |
| 7 | 40.2 | 12.8 | 129 | KPS | 0.3 | 50-50* | 0.7 | K-laurate | 1.50 | $Na_2SO_4$ | 0.13 | 33 | 58–69 |
| 8 | 41.1 | 11.2 | 199 | KPS | 0.07 | t-DDM | 0.5 | Dresinate | 1.00 | — | — | 36 | 65–75 |
| 9 | 41.1 | 11.2 | 95 | KPS | 0.20 | t-DDM | 0.5 | K-oleate | 3.50 | $Na_2H_2PO_4$ | 0.6 | 18 | 54–74 |

TABLE II

| Latex No. | Wt. % solids | pH value | Particle size (nm) | Initiator Type | Amount[1] | Regulator Type | Amount[1] | Emulsifier Type | Amount[1] | Electrolyte Type | Amount[1] | Polym. time (h) | Polym. temp. (° C.) |
|---|---|---|---|---|---|---|---|---|---|---|---|---|---|
| 10 | 40.9 | 7.7 | 144 | KPS | 0.3 | — | — | K-1008 | 2.00 | $Na_2SO_4$ | 0.13 | 6 | 80 |
| 11 | 39.5 | 8.1 | 144 | KPS | 0.3 | — | — | Dresinate | 2.00 | $Na_2SO_4$ | 0.13 | 6 | 80 |
| 12 | 38.3 | n.b. | 95 | KPS | 0.3 | — | — | Mersolate | 2.00 | $Na_2SO_4$ | 0.13 | 6 | 80 |

K-1008 and K-1013: potassium salt of the commercially available oleic acid dimer "Pripol ® 1008" and "Pripol ® 1013" (products from Unichema Chemie GmbH, Emmerich, Germany)
T11: sodium salt of a mixture of saturated and singly unsaturated fatty acids with 12 to 18 carbon atoms (acid no. 204 mg KOH/g), (product from Procter & Gamble, USA)
Dresinate: potassium salt of a disproportionated abietinic acid (product from Abieta Chemie GmbH, Gersthofen, Germany)
KPS: potassium persulfate
Redox: iron (II)-EDTA-complexonate, sodium hydroxymethanesulfinate, t-butyl hydroperoxide (molar ratio $6.5 \times 10^{-3}$:1:2)
t-DDM: tert.-dodecylmercaptan; n-DDM: n-dodecylmercaptan
*mixture of 50 parts by weight t-DDM and 50 parts by weight n-DDM
[1]wt. % referred to rubber Amphiphilic Compounds as Agglomerating Agents Compound I LB 25: a polyether started on butyl diglycol with a middle block of 15.6% propylene oxide (PO) as well as 63.5% ethylene oxide (EO), end-capped with 20.9% EO; mean molecular weight (weight average molecular weight): 2200 (product from Bayer AG)

Compound II

Borchigen SN 95: reaction product of trimeric toluene diisocyanate with LB 25 and dimethylaminoethanol in a molar ratio of 2:1, commercial product from Bayer AG Compound III VP SE 1030: linear block copolymer of a polystyrene block with a mean molecular weight of 1000 g/mole and a polyethylene oxide block with a mean molecular weight of 3000 g/mole (product from Goldschmidt AG, Essen, Germany)

Compound IV

VP ME 1030: linear block copolymer of a polymethyl methacrylate block with a mean molecular weight of 1000 g/mole and a polyethylene oxide block with a mean molecular weight of 3000 g/mole (Goldschmidt AG, Essen, Germany)

Compound V

VP BE 1030: linear block copolymer of a poly-n-butyl acrylate block with a mean molecular weight of 1000 g/mole and a polyethylene oxide block with a mean molecular weight of 3000 g/mole (product from Goldschmidt AG)

Compound VI

VP SE 1010: linear block copolymer of a polystyrene block with a mean molecular weight of 1000 g/mole and a polyethylene oxide block with a mean molecular weight of 1000 g/mole (product from Goldschmidt AG)

Compound VII 30 g (0.15 mole NCO) of Desmodur® N 3300 (trimerised hexamethylene diisocyanate; functionality: 3.8, product from Bayer AG) and 14.7 g (0.05 mole OH) of Baysilon® OF-OH 502 6% (a dimethylpolysiloxane with alcoholic OH groups; functionality=2; 6% OH; product from Bayer AG) are stirred for 3 hours at 80° C. 224 g (0.1 mole OH) of LB 25 are added and the mixture is stirred at the same temperature until the batch is free of NCO (no longer any NCO bands (2263–2275 cm$^{-1}$) in the IR spectrum). The substance obtained is readily dispersible in water.

Compound VIII 30 g (0.15 mole NCO) of Desmodur® N 3300 and 42.5 g (0.05 mole OH) PE 170 HN (polyester of adipic acid and hexanediol as well as neopentyl glycol with a mean molecular weight=1700; functionality=2; product from Bayer AG) are stirred for 3 hours at 80° C. 224 g (0.1 mole OH) of LB 25 are then added and the mixture is stirred at the same temperature until the batch is free from NCO. The substance obtained is readily dispersible in water.

Compound IX 30 g (0.15 mole NCO) of Desmodur® N 3300 and 42.5 g (0.05 mole OH) PE 170 HN are stirred for 3 hours at 80° C. 35 g (0.1 mole OH) of Carbowax 350 (methoxypolyethylene glycol with a mean molecular weight=350; product from Bayer AG) are then added and the mixture is stirred further at the same temperature until the batch is free of NCO. The substance obtained is readily dispersible in water.

Compound X 30.4 g (0.10 mole NCO) of Sovermol DDI (dimethyl diisocyanate, product from Henkel KGaA, Düsseldorf, Germany; mean molecular weight 190 g/mole; NCO=13.8%), 224 g (0.1 mole OH) of LB 25 and 0.05 g of dibutylphosphoric acid are mixed and stirred at 80° C. until the batch is free of NCO. The substance obtained is water-soluble.

Compound XI

P1557-BdEO: linear block copolymer of a poly(1,4-butadiene) block with a mean molecular weight of 5000 g/mole and a polyethylene oxide block with a mean molecular weight of 6000 g/mole (product obtained from Polymer Source, Inc., 771 Lajoie, Montreal, Quebec, Canada H9P 1G7).

Compound XII

P914-SANa: linear block copolymer of a polystyrene block with a mean molecular weight of 4100 g/mole and a poly(sodium acrylate) block with a mean molecular weight of 3200 g/mole (product from Polymer Source, Inc.).

Compound XIII

P1037-S4VP: linear block copolymer of a polystyrene block with a mean molecular weight of 3300 g/mole and a poly(4-vinylpyridine) block with a mean molecular weight of 4750 g/mole (product from Polymer Source, Inc.). This compound is soluble in water only under the addition of acid (0.5 ml 1N HCl per 0.5 g of P1037-S4VP).

Compound XIV

P1358-StAMD: linear block copolymer of a polystyrene block with a mean molecular weight of 16400 g/mole and a polyamide block with a mean molecular weight of 4000 g/mole (product from Polymer Source, Inc.).

Agglomeration of Rubber Latices

Example of a Batchwise Agglomeration: Example 1

100 ml of latex 1 are placed in a 250 ml beaker. 3 ml of an 8% solution of the compound II are added in one go to the latex while stirring. The agglomeration takes place within a few seconds. After 10 minutes' post-stirring the latex is filtered and transferred to a 100 ml PE bottle. No coagulate formation is observed.

Figure 2:
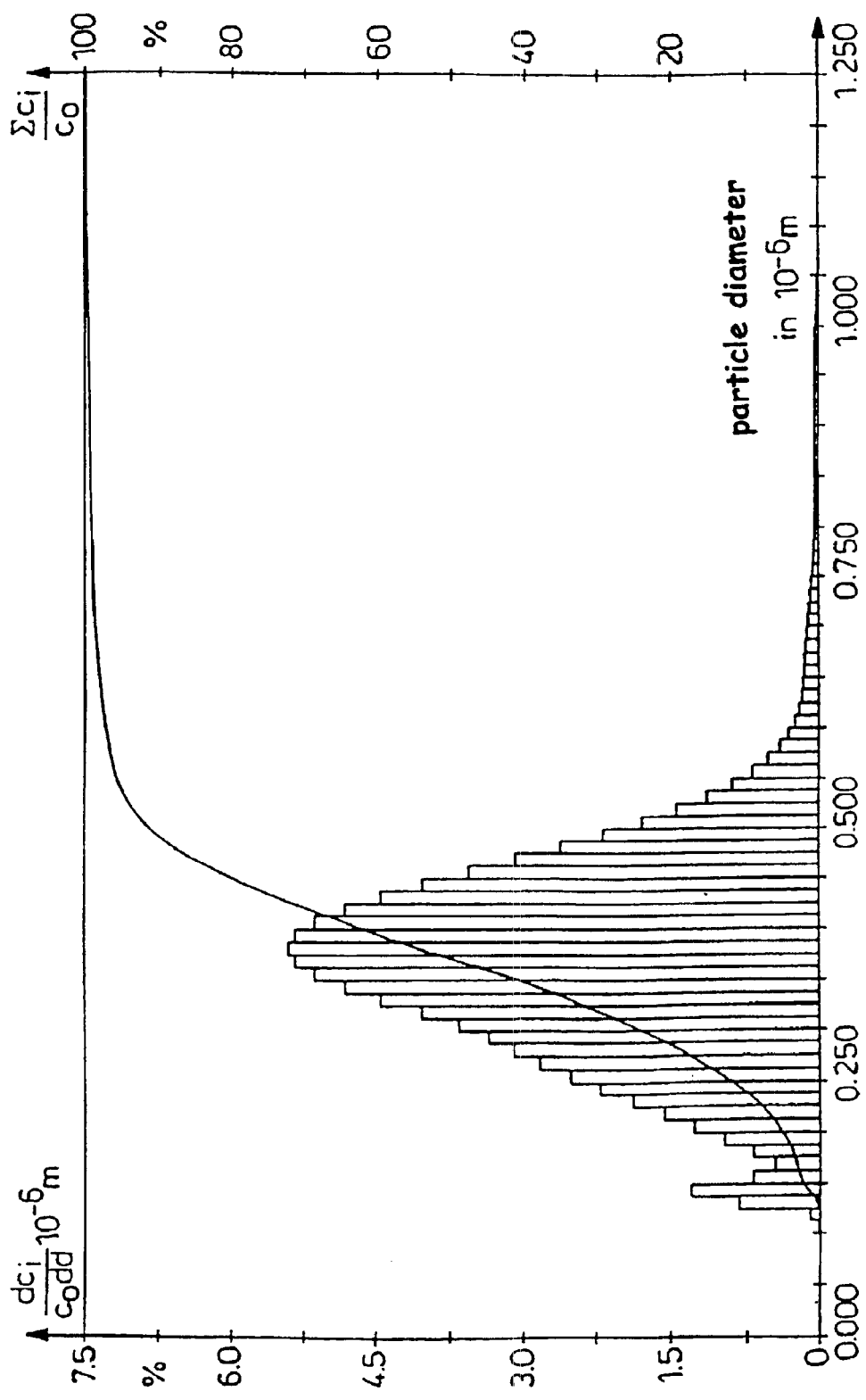
FIG. 2 shows the integral and differential weight distribution of the particle diameters of agglomerated rubber latex.

100 ml of a narrow particle size distribution, agglomerated latex is obtained having a mean particle size of 488 nm (LCS) and 39.1 wt. % solids content, which remained unchanged after storage for one month at room temperature. The integral and differential weight distribution of the particle diameters of this latex, measured by ultracentrifugation, are shown in FIG. 2.

As in Example 1, the latices listed in Table III, column 2, were experimentally agglomerated with the agglomerating agents specified in Table III, column 8, and agglomerating agent concentrations listed in column 10. The properties of the agglomerated latices are listed in columns 12 to 14. Typical dark field microscope images are reproduced in FIG. 3 for the agglomerated latex of Example 2.

Example of a Continuous Agglomeration: Example 19

60 l of latex 1 together with 12 l of a 1% solution of the Compound II are continuously mixed per hour in a static mixer (6 mm diameter, 12 mm long). The agglomerated latex is collected in a receiver equipped with a stirrer. No coagulate formation is observed.

An agglomerated latex with a mean particle size of 320 nm and 32.9 wt. % solids content is obtained.

EXPLANATION OF THE EXAMPLES

From Table III it can be established, see Examples No. 1 to No. 8 as well as Example 37, that when using dimeric soaps (Pripol® 1008 and Pripol® 1013, K salts) in the primary latex and after adding agglomerating agents according to the invention (block amphiphiles), generally coagulate-free agglomeration latices are obtained having the desired mean particle diameters of ca. 300–600 nm. The agglomerating agents II, III, VII and VIII are particularly advantageous.

If the amphiphilic agglomerating agent is not according to the invention, see comparative examples V9 to V12, then practically no agglomeration of the latex takes place: the block compounds VI, IX, X and I prove to be ineffective as they do not have the appropriate structure. Correspondingly the "agglomerate" latices have only very slightly larger mean diameters. Coagulate formation does not occur when adding VI, IX, X and I.

If an agglomerating agent that is effective with dimeric soap primary latices (in this case compound II: Borchigen SN 95) is used on primary latices of comparable particle sizes produced in agglomeration experiments with K oleate (Example 13), resin soap Dresinate (Example 14), K palmitate (Example 15), K laurate (Examples 16 and 19), and tallow fat acid potassium T11 (Example 17), then a very large amount of coagulate (10 to 60%) is formed. Such a large amount of coagulate is not formed with the latices produced with dimeric soaps. Furthermore, the latices of Examples 13 to 17 have a practically unchanged particle size compared to the primary latices, after the coarse coagulate has been filtered or sieved off.

In those cases where the emulsifier is not a dimeric or trimeric fatty acid, the agglomeration conditions must be adjusted more precisely so that the coagulate formation can be minimised. The coagulate formation may be reduced by, inter alia, the following methods:

diluting the agglomerating solution (see Examples 18 and 19)

raising the agglomeration temperature (for example, less coagulate may be formed at 50° C. than at 20° C., see Examples 20 and 21), though not above 70° C.

suitably adapting the structure of the agglomerating agent (for example less coagulate may be formed if the hydrophobic block of the amphiphilic compound is produced based on polysiloxane, see Examples 15 and 22)

adding additional emulsifier to the starting latex before the agglomeration (see Examples 20, 23 and 24)

using a mixture of agglomerating agent and emulsifier (for example a mixture comprising 80 wt. % of amphiphilic copolymer and 20 wt. % of K oleate, see Examples 13 and 25)

altering the pH of the latex (see Examples 26 and 27)

improving the thorough mixing of the latex and agglomerating solution (provided this is possible without subjecting the latex to excessive shear forces, otherwise large amounts of coagulate will be formed).

The dilution of the starting latex and/or the addition of extra emulsifier may lead to the formation of smaller agglomerated particles; in such cases the particle size may be increased by slightly raising the salt concentration (e.g. addition of 0.5 wt. % $Na_2SO_4$, see Examples 26 and 28) without forming larger amounts of coagulate.

Not only can polybutadiene latices be agglomerated by the process according to the invention, but also rubber latices in general are suitable for agglomeration according to this process, as is shown by Examples 29 to 35 based on poly(n-butyl acrylate) latices.

Examples 32 to 35 also show that amphiphilic copolymers with hydrophilic segments that have a structure not based on ethylene oxide are likewise suitable for agglomeration.

From Examples 31 to 35 it can be seen that latices that are produced using sulfonate emulsifiers can be agglomerated by the process according to the invention. The process according to the invention is thus not limited only to carboxylate emulsifiers.

If an agglomerating agent not according to the invention (such as VI) based on emulsifiers other than a dimeric or trimeric soap is employed for the agglomeration of a more sensitive latex, then the effect of the increase in particle size remains unsatisfactory and some coagulate is formed (comparative example V36, resin acid emulsifier).

TABLE III

| 1 | | | Initial latex (cf. Table I) | | | | Agglomerating compound | | 11 | Agglomerating latex | | 14 |
|---|---|---|---|---|---|---|---|---|---|---|---|---|
| | | | | | | | | | % ref. | 12 | 13 | |
| Ex. No.* | Latex No. | Activated with | Emulsifier | Particle size, nm | Solids wt. % | Amount, ml | No. | Amount, ml | Concn., wt. % | to solids | Particle size, nm | Solids wt. % | Coagulate wt. % |
| 1 | 1 | Redox | K-Pripol 1008 | 142 | 39.8 | 100 | II | 3 | 8 | 0.60 | 450 | 39.1 | 0 |
| 2 | 1 | Redox | K-Pripol 1008 | 142 | 39.8 | 50 | II | 0.5 | 8 | 0.20 | 540 | 39.5 | 0 |
| 3 | 2 | KPS | K-Pripol 1013 | 134 | 40.3 | 5000 | II | 30 | 8 | 0.12 | 360 | 39.0 | 3.5 |
| 4 | 2 | KPS | K-Pripol 1013 | 134 | 40.3 | 5000 | III | 30 | 10 | 0.15 | 630 | 39.8 | 0 |
| 5 | 1 | Redox | K-Pripol 1008 | 142 | 39.8 | 50 | VII | 0.5 | 10 | 0.25 | 354 | 39.5 | 0 |
| 6 | 1 | Redox | K-Pripol 1008 | 142 | 39.8 | 50 | VIII | 0.5 | 10 | 0.25 | 476 | 39.5 | 0 |
| 7 | 1 | Redox | K-Pripol 1008 | 142 | 39.8 | 50 | IV | 0.5 | 10 | 0.25 | 219 | ca. 39 | 0 |
| 8 | 1 | Redox | K-Pripol 1008 | 142 | 39.8 | 50 | V | 0.5 | 10 | 0.25 | 208 | ca. 39 | 0 |
| V.9 | 1 | Redox | K-Pripol 1008 | 142 | 39.8 | 50 | VI | 0.5 | 10 | 0.25 | 148 | 39.5 | 0 |
| V.10 | 1 | Redox | K-Pripol 1008 | 142 | 39.8 | 50 | IX | 0.5 | 10 | 0.25 | 152 | 39.5 | 0 |
| V.11 | 1 | Redox | K-Pripol 1008 | 142 | 39.8 | 50 | X | 0.5 | 10 | 0.25 | 176 | 39.3 | 0 |
| V.12 | 1 | Redox | K-Pripol 1008 | 142 | 39.8 | 50 | I | 0.5 | 10 | 0.25 | 146 | 39.5 | 0 |
| 13 | 3 | Redox | K-oleate | 143 | 40.0 | 50 | II | 0.6 | 8 | 0.24 | 246 | 32 | 50 |
| 14 | 6 | KPS | Na-Dresinate | 132 | 41.1 | 50 | II | 0.6 | 8 | 0.23 | 138 | 36.8 | 31 |
| 15 | 4 | Redox | K-palmitate | 145 | 40.1 | 50 | II | 0.6 | 8 | 0.24 | 216 | 30.6 | 56 |
| 16 | 7 | KPS | K-laurate | 129 | 40.2 | 50 | II | 0.6 | 8 | 0.24 | 135 | 36.5 | 21 |
| 17 | 5 | KPS | K-T11 | 128 | 40.1 | 50 | II | 0.6 | 8 | 0.24 | 151 | 33.3 | 57 |
| 18 | 9 | KPS | K-oleate | 64 | 41.1 | 50 | VII | 1.0 | 10 | 0.5 | 403 | 11 | — |

| 1 | | | Initial latex (cf. Table I) | | | | Agglomerating compound | | | Agglomerating latex | | |
|---|---|---|---|---|---|---|---|---|---|---|---|---|
| | | | | | | | 11 | 12 | 13 | 14 | | |
| Ex. No.* | Latex No. | Activated with | Emulsifier | Particle size, nm | Solids wt. % | Amount, ml | No. | Amount, ml | Concn., wt. % | % ref. to solids | Particle size, nm | Coagulate wt. % | Variant |
| 19 | 9 | KPS | K-oleate | 64 | 41.1 | 50 | VII | 5.0 | 2 | 0.5 | 410 | 0.4 | Diluted agglom. sol. |
| 20 | 7 | KPS | K-laurate | 129 | 40.2 | 50 | III | 0.5 | 10 | 0.25 | 270 | 22 | — |
| 21 | 7 | KPS | K-laurate | 129 | 40.2 | 50 | III | 0.5 | 10 | 0.25 | 270 | <0.5 | T = 50° C. |
| 22 | 4 | Redox | K-palmitate | 145 | 40.1 | 50 | VII | 0.5 | 10 | 0.25 | 332 | 0 | — |
| 23 | 7 | KPS | K-laurate | 129 | 40.2 | 50 | III | 0.5 | 10 | 0.25 | 250 | 0 | Latex + 0.25% Pripol 1008 |
| 24 | 7 | KPS | K-laurate | 129 | 40.2 | 50 | III | 0.5 | 10 | 0.25 | 360 | 0 | Latex + 0.5% K-laurate |
| 25 | 3 | Redox | K-oleate | 143 | 40.0 | 50 | II++ | 0.6 | 6.7 | 0.20 | 450 | 0 | II++: stock sol. of 5 ml II 8% + 1 ml K-oleate 10% |
| 26 | 8 | KPS | Na-Dresinate | 199 | 41.1 | 50 | VII | 1.0 | 10 | 0.5 | 250 | <0.1 | Latex + 4 ml water |
| 27 | 8 | KPS | Na-Dresinate | 199 | 41.1 | 50 | VII | 1.0 | 10 | 0.5 | 310 | 1.1 | pH = 10 adjusted with $H_2SO_4$ |
| 28 | 8 | KPS | Na-Dresinate | 199 | 41.1 | 50 | VII | 1.0 | 10 | 0.5 | 470** | <0.1 | Latex + 4 ml water $Na_2SO_4$ 0.5% |
| 29 | 10 | KPS | K-Pripol 1008 | 144 | 40.9 | 50 | VII | 0.5 | 10 | 0.25 | 268 | 0 | — |
| 30 | 11 | KPS | Na-Dresinate | 144 | 39.5 | 50 | VII | 0.5 | 10 | 0.25 | 416 | 0 | — |
| 31 | 12 | KPS | K-mersolate | 95 | 38.3 | 50 | VII | 0.5 | 10 | 0.26 | 300 | <0.1 | — |
| 32 | 12 | KPS | K-mersolate | 91*** | 38.3 | 12.5 | XI | 1 | 5 | 1.04 | 265*** | 0 | — |
| 33 | 12 | KPS | K-mersolate | 91*** | 38.3 | 12.5 | XII | 2 | 0.25 | 1.04 | 147*** | 0 | — |
| 34 | 12 | KPS | K-mersolate | 91*** | 38.3 | 12.5 | XIII | 2 | 0.27 | 1.13 | 226*** | 20 | — |
| 35 | 12 | KPS | K-mersolate | 91*** | 38.3 | 12.5 | XIV | 2 | 0.25 | 1.04 | 215*** | 0 | — |
| V.36 | 6 | KPS | Na-Dresinate | 132 | 41.1 | 50 | VI | 0.5 | 10 | 0.24 | 162 | 1 | — |
| 37 | 1 | Redox | K-Pripol 1008 | 142 | 39.8 | 60000 | II | 12000 | 1 | 0.50 | 320 | 0 | — |

*V.: Comparative example, not according to the invention
*V.: Comparative example, not according to the invention; turbidity measurement; *light scattering at measurement angle of 30°

What is claimed is:

1. Process for the agglomeration of finely particulate rubber latex comprising the step of adding an aqueous solution of a water-soluble amphiphilic copolymer comprising at least one hydrophilic segment and at least one hydrophobic segment, wherein the molecular weigh HB of the largest hydrophobic segment is greater than 500 g/mole and the molecular weight HL of the largest hydrophilic segment of the amphiphilic copolymer is greater than 2000 g/mole, to a rubber latex.

2. The process according to claim 1, wherein the hydrophilic segment of the copolymer comprises at least one monomer selected from the group consisting of ethylene oxide, acrylamide, alkaline salts of methacrylic acid, vinylpyrrolidone, N-2- and 4-vinylpiridine, ethyleneimines, alkaline salts of 4-styrenesulfonic acid, vinyl alcohol, dimethylaminoethyl methacrylate, hydroxyethyl methacrylate, a mixture thereof or a mixture thereof with up to 30 wt.% of a hydrophobic monomer.

3. The process according to claim 1, wherein the hydrophobic segment of the copolymer comprises at least on hydrophobic monomer selected from the group consisting of styrene, α-methylstyrene, including its ring-substituted derivatives, olefins with 3 to 12 C atoms, alkyl acrylates, alkyl methacrylates, propylene oxide, dimethylsiloxane, phenylmethylsiloxane, aliphatic hydroxycarboxylic acids, esters of aromatic or aliphatic dicarboxylic acids with aliphatic diols, and urethanes derived from aromatic and/or aliphatic diisocyanates with aliphatic diols.

4. The process according to claim 1, wherein an emulsifier is used and is an alkali metal salt of dimeric or trimeric fatty acids or mixtures thereof with up to 50 wt % of another anionic emulsifier.

5. The process according to claim 4, wherein said emulsifier comprises an alkali metal salt of a saturated or unsaturated dimer of an unsaturated aliphatic carboxylic acid.

6. The process according to claim 1, wherein the agglomeration is carried out in a continuous procedure.

7. An impact-resistant thermoplastically processable molding comprising rubber latex prepared by adding an aqueous solution of a water-soluble amphiphilic copolymer comprising at least one hydrophilic segment and at least one hydrophobic segment, wherein the molecular weight HB of the largest hydrophobic segment is greater than 500 g/mole and the molecular weight HL of the largest hydrophilic segment of the amphiphilic copolymer is greater than 2000 g/mole, to a rubber latex.

8. A process for producing a coarsely particulate rubber latex comprising the steps of preparing a finely particulate rubber latex and then agglomerating the latex by adding an amphiphilic copolymer comprising at least one hydrophilic segment and at least one hydrophobic segment, wherein the molecular weight HB of the largest hydrophobic segment is greater than 500 g/mole and the molecular weight HL of the largest hydrophilic segment of the amphiphilic copolymer is greater than 2000 g/mole.

* * * * *